United States Patent Office 3,816,613
Patented June 11, 1974

3,816,613
ANTI-PERSPIRANT AEROSOL COMPOSITION AND METHOD OF MAKING SAME
Stewart M. Beekman, Signal Mountain, Tenn., assignor to Chattem Chemicals, Division of Chattem Drug & Chemical Company, Chattanooga, Tenn.
No Drawing. Filed Sept. 4, 1968, Ser. No. 757,451
Int. Cl. A61k 7/00
U.S. Cl. 424—47
3 Claims

ABSTRACT OF THE DISCLOSURE

Stable anti-perspirant compositions suitable for use in aerosols which are non-gelling, substantially non-corrosive, and have reduced stickiness, the compositions including the reaction product between a particular family of chlorhydroxy aluminum complexes, a basic aluminum chloride, and a hydroxylic agent, the reaction being conducted in a medium of absolute ethanol.

CROSS REFERENCE TO RELATED APPLICATION

This application represents an improvement on the subject matter disclosed and claimed in Holbert, Beekman and Schmank, application Ser. No. 527,077 entitled "Anti-Perspirant Aerosol Compositions" filed Feb. 14, 1966, now U.S. Pat. No. 3,523,153.

BACKGROUND OF THE INVENTION

Field of the invention

This invention is directed to an improved aerosol composition and to a method of preparing the active ingredient thereof, the reaction being carried out under substantially water-free conditions between the chlorhydroxy aluminum complex, the basic aluminum chloride, and a hydroxylic agent.

Description of the prior art

The November 1966 issue of "Drug and Cosmetic Industry" contains an article by Martin et al. setting forth the requirements of an ideal aerosol anti-perspirant. The authors state that the anti-perspirant should, when properly formulated, provide maximum anti-perspirant efficacy. The product should be only moderately acid in solution to provide a minimum of container corrosion, skin irritation, fabric destruction, and perfume degradation. The material must be neither a primary irritant nor a sensitizer. It should be soluble in anhydrous media and compatible with the commonly used propellants to provide formulation systems which contain less than 1% water. When properly formulated at effective concentrations, it should have no tendency to clog the valve actuator mechanism and should provide a relatively quick drying, non-tacky spray. The composition should have minimum tendency to stain or reduce the tensile strength of fabrics in contact with underarm areas.

The article suggests that these requirements can be met by combining a basic aluminum chlorhydroxide with propylene glycol such that the weight ratio of aluminum oxide to propylene glycol is about 1.25 to 1. These compositions, however, do not completely satisfy the requirements set forth by the authors. These compositions are not particularly stable at temperatures in excess of 100° F. when prepared with effective concentrations of the aluminum compound such as 9% by weight. The aerosols made with these materials tend to gel spontaneously unless so-called anti-gelling agents are added. The addition of such anti-gelling agents, however, leads to the inhibition of anti-perspirant efficacy by virtue of an apparent interaction with the active ingredient.

Another drawback which has been experienced in this type of composition results from the relatively high amount of propylene glycol present (80% of the weight of the aluminum compound, calculated as $Al_2O_3$). Propylene glycol when present in the aerosol composition in substantial amounts, creates an annoying stickiness in the underarm area which persists for a considerable length of time. This stickiness can only partly be overcome by the further addition of emollients which themselves tend to reduce anti-perspirant efficacy.

A somewhat similar material is described in U.S. Pat. No. 3,359,169 issued to Slater et al. in Dec. 19, 1967. This patent describes a method of making aluminum chlorhydroxide complexes with hydroxylic reagents in the presence of sufficient water to dissolve the aluminum compound and then removing the water from the system by evaporation to form an astringent product. The difficulty with this system is the inability to remove all of the water from the reaction medium. A significant amount of water present in the aerosol can create substantial problems because of corrosion.

SUMMARY OF THE INVENTION

The present invention provides a stable anti-perspirant composition particularly suited for aerosols because of its high temperature stability and its non-corrosive nature. The active ingredient of the composition is prepared by reacting a particular type of chlorhydroxy aluminum complex with a basic aluminum chloride and a hydroxylic agent and heating the mixture until such time as a clear solution is obtained. The resulting composition is completely compatible with anhydrous ethanol and with conventional fluorocarbon propellants and, because of its reduced hydroxylic agent content, it does not provide the stickiness which is characteristic of prior art compositions.

DESCRIPTION OF THE PREFERRED EMBODIMENTS

The chlorhydroxide aluminum complex used in accordance with the present invention is that which is described in the co-pending application of Holbert et al. Ser. No. 527,077, now U.S. Pat. No. 3,523,153 and has the following empirical formula:

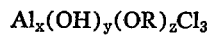

$$Al_x(OH)_y(OR)_zCl_3$$

where $x$ is an integer from 3 to 6, inclusive, $y+z=3x-3$, $y$ is greater than $x$, and $z$ is an integer from 0 to 6, inclusive, the OR groups, when present, being either ethoxy groups or isopropoxy groups or mixtures of the two.

As apparent from the foregoing formula, the alkoxy groups are optional. They are preferably included when there might be a significant amount of water present, in that the alkoxy groups would split off and form an alcohol and thereby assimiliate some of the water.

Representative compounds coming within the class definition arranged in order of increasing aluminum content are given in the following table:

| | |
|---|---|
| $Al_3(OH)_6Cl_3$ | $Al_4(OH)_9Cl_3$ |
| $Al_3(OH)_5(OR)Cl_3$ | $Al_5(OH)_6(OR)_6Cl_3$ |
| $Al_3(OH)_4(OR)_2Cl_3$ | $Al_5(OH)_8(OR)_4Cl_3$ |
| $Al_4(OH)_5(OR)_3Cl_3$ | $Al_5(OH)_9(OR)_3Cl_3$ |
| $Al_4(OH)_6(OR)_3Cl_3$ | $Al_6(OH)_9(OR)_6Cl_3$ |
| $Al_4(OH)_7(OR)_2Cl_3$ | $Al_6(OH)_{10}(OR)_5Cl_3$ |

The method involved in the synthesis of these compounds, as explained in the aforementioned co-pending application, involves reacting aluminum chloride hexahydrate while dissolved in substantially anhydrous ethanol with aluminum isopropylate, and recovering the reaction products so produced. The term "anhydrous" when used herein refers to an alcohol containing at least 95% ethanol, and includes the "absolute" alcohol compositions which contain about 99% ethanol.

For every molecular proportion of aluminum chloride hexahydrate, there are present $(x-1)$ molecular proportions of aluminum isopropylate, using the same definition of $x$ as previously. In the synthesis of these compounds, only moderately elevated temperatures are required. Vigorous agitation, however, is usually required during the addition of the aluminum isopropylate.

The basic aluminum chloride used in accordance with the present invention has the formula $Al_2(OH)_5Cl$. This compound may be prepared in accordance with the procedure described in Australian Pat. 150,410 of Mar. 15, 1953. Basically, this procedure involves reacting 4 atomic proportions of aluminum with 1 molecular weight of aluminum chloride in water, followed by filtration, drying in circulating warm air at 65° C., and then pulverizing.

The preferred hydroxylic compounds for use in the present invention are propylene glycol and trimethylol propane. Other materials, however, can also be used such as ethylene glycol, 1,4-butanediol, as well as the polyethylene and polypropylene glycols. The polyoxyalkylene ether derivatives of these glycols can also be used. Still other hydroxylic agents which can be used include aliphatic triols containing up to about 6 carbon atoms per molecule and glycol mono-ethers such as diethylene glycol monoethyl ether can also be employed.

The relative amounts of the two aluminum compounds and the hydroxylic agent should be selected such that the ratio of aluminum from both sources, calculated as aluminum oxide, $Al_2O_3$, is at least 1.8 times the amount of the hydroxylic agent present by weight.

The reaction between the three reactants is carried out in a medium of anhydrous ethanol so as to avoid the presence of significant amounts of water. The reaction proceeds under conditions of good agitation and mild heating. The temperature range extends from 25 to 75° C., and is typically at 65° C. The time of reaction of course varies with the temperature and may extend from a few hours to as much as 20 hours.

The reaction product thus produced is then combined in an aerosol with additional amounts of absolute ethanol and a suitable propellant. All of the commercially available fluorocarbons and chloro-fluorocarbons used as aerosol propellants are satisfactory for use in accordance with the present invention, since the reaction product is compatible with all these materials. Different mixtures, of course, of these fluorocarbons can be used to achieve various vapor pressure levels. A typical example of a suitable propellant is a mixture of "Freon 12" and "Freon 114," the former being dichloro-difluoromethane and the latter being dichloro-tetrafluoroethane. Because of the stability of the compositions of the present invention, it is not necessary to add anti-gelling agents. Because the amount of hydroxylic agent is reduced, the compositions after application do not evidence a high degree of stickiness.

While the proportions of the various ingredients in the aerosol composition can be varied significantly, depending upon the ultimate use, I prefer to employ a concentration of 20 to 40% by weight of a 20% solution of the aforementioned reaction product in absolute ethanol. The concentration of the reaction product would therefore be in the range from 4 to 8%. Coupled with this, I may add additional amounts of anhydrous ethanol to the extent of 10 to 30% by weight of the composition. The remaining 30 to 60% by weight of the composition consists of the propellant.

The following specific examples will serve to illustrate the present invention but are not to be construed as limiting the scope thereof.

EXAMPLE I

The following ingredients were added to a 50 gallon reactor provided with a variable speed agitator: 163 pounds of anhydrous ethanol, 20 pounds of propylene glycol, 51.5 pounds of basic aluminum chloride powder having the formula $Al_2(OH)_5Cl$ and 115.5 pounds of a 25% alcohol solution of the compound $Al_4(OH)_9Cl_3$. The mixture was heated with agitation to 75° C. until a homogeneous clear solution was obtained. This required several hours. The mixture was filtered under a pressure of about 20 pounds p.s.i. gauge through a 10 micron epoxy impregnated filter into an alcohol and acid resistant vessel. The pale yellow or slightly amber solution had the following composition:

| Entity | Actual, percent | Theory for $Al_5(OH)_{12}Cl_3$, percent |
|---|---|---|
| Aluminum as $Al_2O_3$ | 11.4 | 11.5 |
| Chlorides | 4.7 | 4.8 |
| Ethanol | 68.3 | 68.6 |
| Isopropanol | 2.5 | 2.6 |
| Propylene glycol | 5.6 | 5.8 |
| $Al_5(OH)_{12}Cl_3$ | 19.9 | 20.0 |
| Water (Karl Fisher) | 1.3 | |

An aerosol was prepared from a 20% absolute ethanol solution of the reaction product, using 30 grams of the solution, 25 grams of added absolute ethanol, and 45 grams of propellant ("Freon" 12/114 in a 40/60 ratio). The anti-perspirant effectiveness of the aerosol was tested on a panel of eight female subjects. After controlled collections of auxiliary perspiration of four separate days, two second sprays were made in each axillae and after an hour's time two twenty minute collections were made. This was done on four separate days.

The mean average reduction in perspiration in the eight subjects after the second, third and fourth applications was 42.3±8.8% for the second application, 48.0±9.1% for the third application and 58.3±8.6% for the fourth application. The mean average for the three collections was 49.6±4.5%

EXAMPLE II

The reactor of Example I was charged with 156 pounds of anhydrous ethanol, 21 pounds of trimethylol propane, 53 pounds of the basic aluminum chloride mentioned in Example I, and 120 pounds of the same aluminum chlorhydroxide solution mentioned in Example I. Using a moderate degree of agitation, heat was applied by steam condensing in the jacket of the reactor until a temperature of 65 to 75° C. was obtained. After several hours, a clear solution resulted. The clear solution was filtered under pressure to remove trace insolubles.

The solution had the following properties:

|  | Percent |
|---|---|
| Aluminum, as $Al_2O_3$ | 11.5 |
| Chlorides, as Cl | 4.8 |
| Trimethanol propane | 5.75 |
| Ethanol | 68.5 |
| Isopropanol | 2.6 |
| pH (1 part per 5 parts $H_2O$) | 4.3 |
| Water (Karl Fisher) | 1.4 |

Test aerosols made using 30% w./w. of a 20% solution of the product combined with 25% added anhydrous ethanol and 45% of a propellant ("Freon" 12/114) provided positive anti-perspirant activity without leaving a sticky residue.

EXAMPLE III

An alkoxy substituted compound can be used in the formulation as follows: 177 pounds of $$Al_5(OH)_9(OC_2H_5)_3Cl_3$$

in the form of a 30% solution in absolute ethanol can be combined with 37.5 lbs. of $Al_2(OH)_5Cl$ powder, and 14.3 lbs. of trimethylol propane. After heating to 65–75° C. for several hours, a clear solution will be obtained. The resulting solution can be combined with additional amounts of absolute ethanol and propellants as set forth in the previous examples.

EXAMPLE IV

About 190 lbs. of a 25% solution of $Al_3(OH)_6Cl_3$ in ethanol can be reacted with 51.8 lbs. of $Al_2(OH)_5Cl$ powder and 21.8 lbs. of trimethylol propane in the presence of 86.5 lbs. additional anhydrous ethanol. After heating to produce a clear solution, a compound having the empirical formula $Al_4(OH)_9Cl_3$ is obtained. The reaction product including this compound can be combined into an aerosol in the amount of 30% by weight of a 25% ethanol solution, with 25% by weight added ethanol, and 45% by weight of propellant to produce an effective anti-perspirant.

EXAMPLE V

The compound $Al_5(OH)_9(OC_2H_5)_3Cl_3$ can be reacted with two molecular proportions of $Al_2(OH)_5Cl$ in the presence of trimethylol propane and anhydrous ethanol to produce a compound having the empirical formula $$Al_9(OH)_{19}(OC_2H_5)_3Cl_5.$$

The latter can be reacted with three molecular proportions of water in the presence of ethanol to produce a reaction product including the compound $Al_9(OH)_{22}Cl_5$. This reaction product can then be combined with the other aerosol ingredients to provide an effective anti-perspirant.

While it is not necessary in most cases to do so, it should be realized that the various reaction products in the form of a clear solution may be dried at low temperatures to remove ethanol and provide a dry material which can be redissolved in anhydrous ethanol.

I claim as my invention:

1. The method of preparing a stable anti-perspirant which comprises bringing together in an anhydrous ethanol medium
   (A) a compound having the empirical formula:

$$Al_x(OH)_y(OR)_zCl_3$$

where $x$ is an integer from 3 to 6, $y+z=3x-3$, $y$ is greater than $x$, $z$ is an integer from 0 to 6, and the OR is selected from the group consisting of ethoxy groups, isopropoxy groups, and mixtures thereof,
   (B) an aluminum chlorhydroxide complex having the formula:

$$Al_2(OH)_5Cl, \text{ and}$$

(C) propylene glycol, the ratio of aluminum, calculated as $Al_2O_3$ from (A) and (B) being at least 1.8 times the amount of (C) present, and heating the resulting mixture at a temperature of from 25 to 75° C. until a clear solution is obtained.

2. The method of preparing a stable anti-perspirant which comprises bringing together in an anhydrous ethanol medium
   (A) a compound having the empirical formula:

$$Al_x(OH)_y(OR)_zCl_3$$

where $x$ is an integer from 3 to 6, $y+z=3x-3$, $y$ is greater than $x$, $z$ is an integer from 0 to 6, and the OR is selected from the group consisting of ethoxy groups, isopropoxy groups, and mixtures thereof,
   (B) an aluminum chlorhydroxide complex having the formula:

$$Al_2(OH)_5Cl, \text{ and}$$

(C) trimethylol propane, the ratio of aluminum, calculated as $Al_2O_3$ from (A) and (B) being at least 1.8 times the amount of (C) present, and heating the resulting mixture at a temperature of from 25 to 75° C. until a clear solution is obtained.

3. An aerosol composition consisting essentially of a reaction product prepared as recited in claim 1, anhydrous ethanol, and a fluorocarbon propellant, the amount of water in said composition being less than 1% by weight.

References Cited

UNITED STATES PATENTS

| | | | |
|---|---|---|---|
| 2,823,169 | 2/1958 | Brown, Jr. et al. | 424—68 |
| 3,420,932 | 1/1969 | Jones et al. | 424—47 |
| 3,472,928 | 10/1969 | Virzi | 424—68 X |
| 3,472,929 | 10/1969 | Jones et al. | 424—68 |

ALBERT T. MEYERS, Primary Examiner

D. R. ORE, Assistant Examiner